US011226755B1

(12) United States Patent
Douglass et al.

(10) Patent No.: US 11,226,755 B1
(45) Date of Patent: Jan. 18, 2022

(54) CORE DUMP IN A STORAGE DEVICE

(71) Applicant: Amazon Technologies, Inc., Seattle, WA (US)

(72) Inventors: Christopher J. Douglass, Seattle, WA (US); Gang Xue, Kenmore, WA (US); Tyler Huston Doornenbal, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 452 days.

(21) Appl. No.: 15/718,095

(22) Filed: Sep. 28, 2017

(51) Int. Cl.
*G06F 3/06* (2006.01)
*G06F 12/10* (2016.01)

(52) U.S. Cl.
CPC .......... *G06F 3/0647* (2013.01); *G06F 3/0604* (2013.01); *G06F 3/068* (2013.01); *G06F 3/0659* (2013.01); *G06F 12/10* (2013.01); *G06F 2212/1032* (2013.01); *G06F 2212/657* (2013.01)

(58) Field of Classification Search
CPC .... G06F 11/0778; G06F 3/064; G06F 3/0659; G06F 3/0604; G06F 3/068; G06F 12/10; G06F 2212/657; G06F 2212/1032
See application file for complete search history.

(56) References Cited

U.S. PATENT DOCUMENTS

| | | | | |
|---|---|---|---|---|
| 6,769,077 B2 * | 7/2004 | Vachon | ............... | G06F 11/3636 714/43 |
| 8,966,319 B2 * | 2/2015 | Fai | ........................ | G06F 11/362 714/42 |
| 2001/0053090 A1 * | 12/2001 | Takata | .................. | G11C 11/005 365/185.08 |
| 2005/0013153 A1 * | 1/2005 | Perroni | ............... | G06F 13/4291 365/100 |
| 2011/0004780 A1 * | 1/2011 | Hirata | ................... | G06F 11/073 714/2 |
| 2015/0081958 A1 * | 3/2015 | Li | ............................. | G06F 1/30 711/103 |
| 2015/0227316 A1 * | 8/2015 | Warfield | ............... | G06F 3/0611 711/103 |

(Continued)

FOREIGN PATENT DOCUMENTS

WO     WO-0140940 A2 *   6/2001   ............ G06F 11/362

OTHER PUBLICATIONS

"Interrupt"—Feb. 16, 2016 and "Message Signaled Interrupts"—Mar. 16, 2016, Wikipedia, pp. 1-13 of provided copy https://web.archive.org/web/20160214062236/https://en.wikipedia.org/wiki/Interrupthttps://web.archive.org/web/20160316095220/https://en.wikipedia.org/wiki/Message_Signaled_Interrupts (Year: 2016).*

(Continued)

*Primary Examiner* — Reginald G Bragdon
*Assistant Examiner* — Curtis James Kortman
(74) *Attorney, Agent, or Firm* — Klarquist Sparkman, LLP

(57) ABSTRACT

A system includes a host controller and a solid state storage card coupled to the host controller. The solid state storage card comprises an interface to the host controller, processor core, volatile memory, and non-volatile memory. Upon receipt of a core dump triggering event, the processor core copies execution state data from a register of the processor core to a buffer in the volatile memory and writes core dump data of the buffer to the non-volatile memory. The host controller reads the core dump data from the solid state storage card's non-volatile memory through the interface.

11 Claims, 4 Drawing Sheets

(56) References Cited

U.S. PATENT DOCUMENTS

2016/0378579 A1* 12/2016 Zhao .................. G06F 11/0748
714/37
2017/0220406 A1* 8/2017 Parnell ................ G06F 11/0778

OTHER PUBLICATIONS

David, Apr. 30, 2015, "Assertions in C++, and Why Not to Use assert( )", Softwariness, pp. 1-8 of provided copy https://web.archive.org/web/20150430091008/https://www.softwariness.com/articles/assertions-in-cpp/ (Year: 2015).*

Open Systems Resources, Inc., Apr. 4, 2015, "Introduction to NVMe Technology", OSR Inc., pp. 1-5 of provided copy http://web.archive.org/web/20150404013242/https://www.osr.com/nt-insider/2014-issue4/introduction-nvme-technology/ (Year: 2015).*

* cited by examiner

CORE DUMP IN A STORAGE DEVICE

BACKGROUND

Electronic systems often include processors, memory, and registers that continually change state as the systems execute. Problems can occur with the execution state of an electronic system. Examples of problems include bugs in the firmware executed by the processors, hardware failures, etc. It can be useful to extract information about the state of a system.

BRIEF DESCRIPTION OF THE DRAWINGS

For a detailed description of various examples, reference will now be made to the accompanying drawings in which.

DETAILED DESCRIPTION

A data center may include one or more (and often numerous) storage systems for use by users of the service provider that operates the data center. Users can access and use the services offered by the data center, such as requesting allocations of storage from the storage systems. The storage systems include one or more solid state storage cards. A storage system, like many electronic devices, is susceptible to errant behavior as noted above. In accordance with the disclosed embodiments, each solid state storage card is capable of performing a "core dump" upon detection of aberrant behavior. A core dump includes saving some or all of the state of the solid state storage card to persistent memory, usually memory that is internal to the solid state storage card. A host controller within the storage system can retrieve the core dump data from a given solid state storage card for further processing (e.g., to determine the source of the problem). A register within the solid state storage device is pre-configured to provide a mapping of addresses used by the host controller to the core dump stored within the solid state storage card to thereby provide the host controller with direct access to the core dump data. As such, even if the operating state of the solid state storage card is experiencing a problem (e.g., incorrect state), the hardware controller need not rely on the solid state storage card's firmware for support in reading the core dump data.

Figure 1:
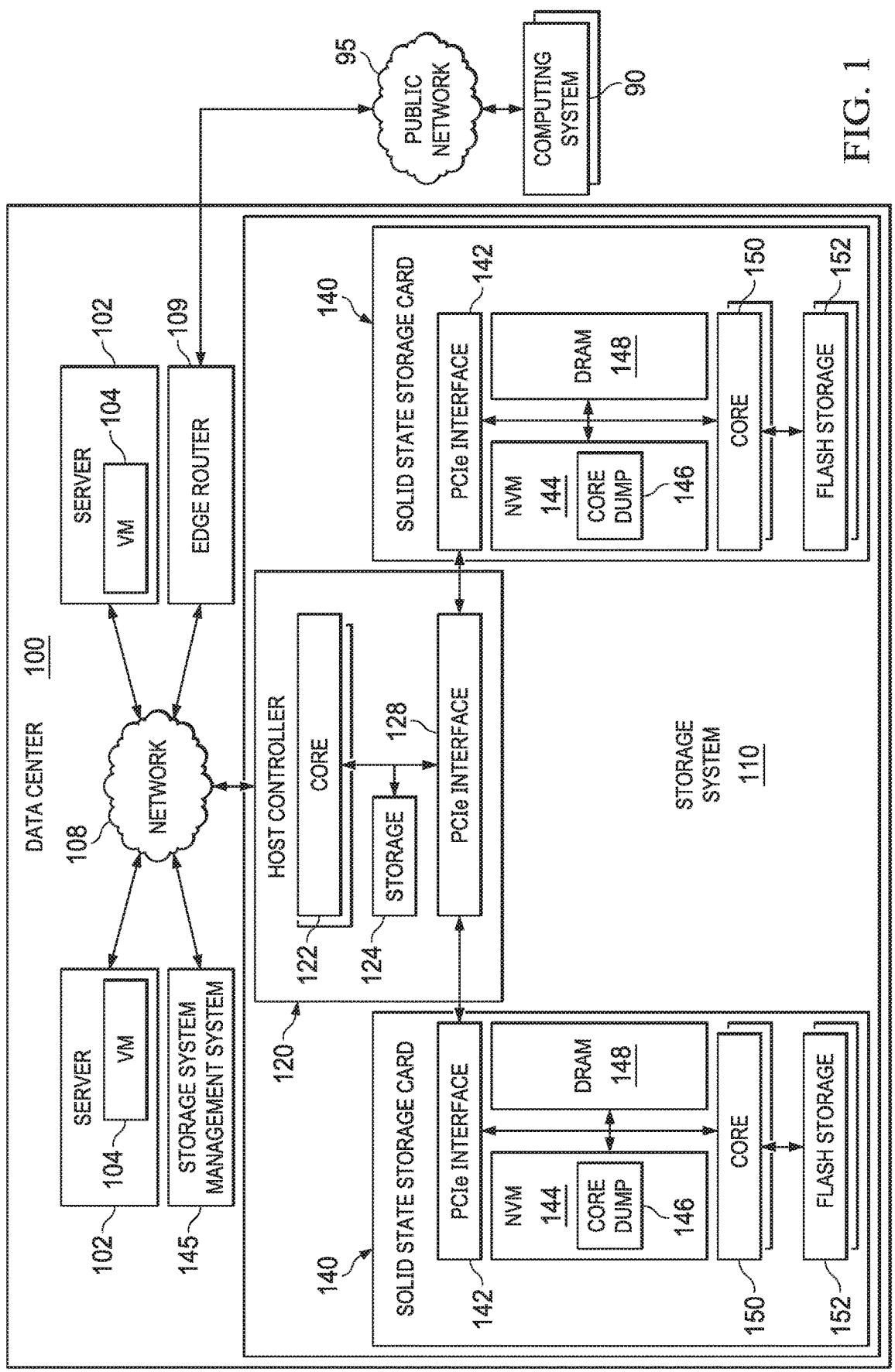
FIG. 1 shows a system comprising a storage system including one or more solid state storage cards in accordance with various examples.

FIG. 1 shows a system in accordance with an embodiments. The illustrative system is directed to a data center 100 which is accessible by external computing systems 90 over a public network 95. The public network 95 may comprise any of a variety of local and wide area networks, wireless networks, wired networks, the Internet, etc. The computing systems 90 may comprise personal computers, tablet devices, smart phones, or other types of network-enabled devices. Through such computing systems 90, users of the data center 100 can access whatever services the data center provides such as the ability to create and use virtual machines to run the users' personal and/or business software, host websites, etc., request allocations of persistent storage, and other services.

The data center 100 includes a plurality of servers 102, a storage system 110, and a storage system management service 145 coupled together over an internal network 108. The internal network 108 may comprise one or more switches, routers, and other types of network devices. An edge router 109 provides network connectivity between the servers 102 and storage system 110 within the data center and the external computing systems 90. Each server 102 comprises one or more processors, memory, network interfaces, and other hardware. The servers 102 may execute one more virtual machines 104, although not all servers need be configured to execute virtual machines. Users can access a user management interface (not shown) to request the creation, configuration, termination, etc. of one or more virtual machines 104. A user can have as many virtual machines 104 as desired. Software provided by the users via computing systems 90 and/or provided by the data center itself can be downloaded to, and executed within, a virtual machine. One or more virtual machines can thus be used by a given user perform any of a variety of operations such as hosting a website, batch processing, etc. Users may desire to have an allocation of a persistent storage associated with their virtual machine(s). The storage system management service 145 responds to user requests for allocations of storage from the storage system 110. The storage system management service 145 may allocate a portion of the storage capacity of the storage system 110 to one or more virtual machines operated by a user, or for external use by the user as a remote storage to a computing system 90.

As shown in the example of FIG. 1, the storage system 110 includes a host controller 120 coupled to one or more solid state storage cards 140. The solid state storage cards 140 are field replaceable units and may, in some cases, be "hot plugged." As such, solid state storage cards 140 can be added to, and removed from, the storage system 110 as demand for data capacity evolve over time. Further, the storage system 110 need not be powered down, although it can be powered down, to add and/or remove a solid state storage card 140. Although two solid state storage media cards 140 are shown in the example of FIG. 1, more than two solid state storage media cards can be installed in the storage system 110 as desired.

Each solid state storage card 140 includes one more flash memory devices 152 into which user data can be stored. The user data may comprise data generated by a users' virtual machine 104, data directly from a user's external computing system 90, or other user data from various services within the data center. The flash memory devices 152 comprise persistent storage for the user data meaning that the data stored thereon persists through a power cycle or initialization event. Each solid state storage card also includes one or more processor cores 150, volatile memory 148 (e.g., dynamic random access memory, DRAM) 148, non-volatile memory 144, and an interface 142. The interface 142 may be implemented in accordance with the Peripheral Component Interconnect Express (PCIe) standard, although other types of interfaces may be used as well. The interface 142 provides data connectivity between the solid state storage card 140 and the host controller. Data to be stored on a solid state storage media card 140 may be received by the host controller 120 over the internal network 108 and forwarded to the appropriate solid state storage card 140 for storage thereon. In other embodiments, the data may bypass the host controller 120. When aberrant behavior of a solid state storage card 140 is detected, the card performs a core dump of its state as described below. The non-volatile memory 144 can be used to store the core dump data 146 for subsequent retrieval by the host controller 120.

The host controller 120 includes one or more processor cores 122, which may be same or different from the processor cores 150 of the solid state storage cards 140. The host controller 120 also includes, or has access to, storage 124 which may be volatile or non-volatile storage. The storage 124 is used to store core dump when received by the host controller 120 from a solid state storage card 140 that has performed a core dump. Systems and services external to the storage system 110 (e.g., the storage system management service 145) can retrieve the core dump data from the host controller's storage 124 for further analysis and processing.

Figure 2:
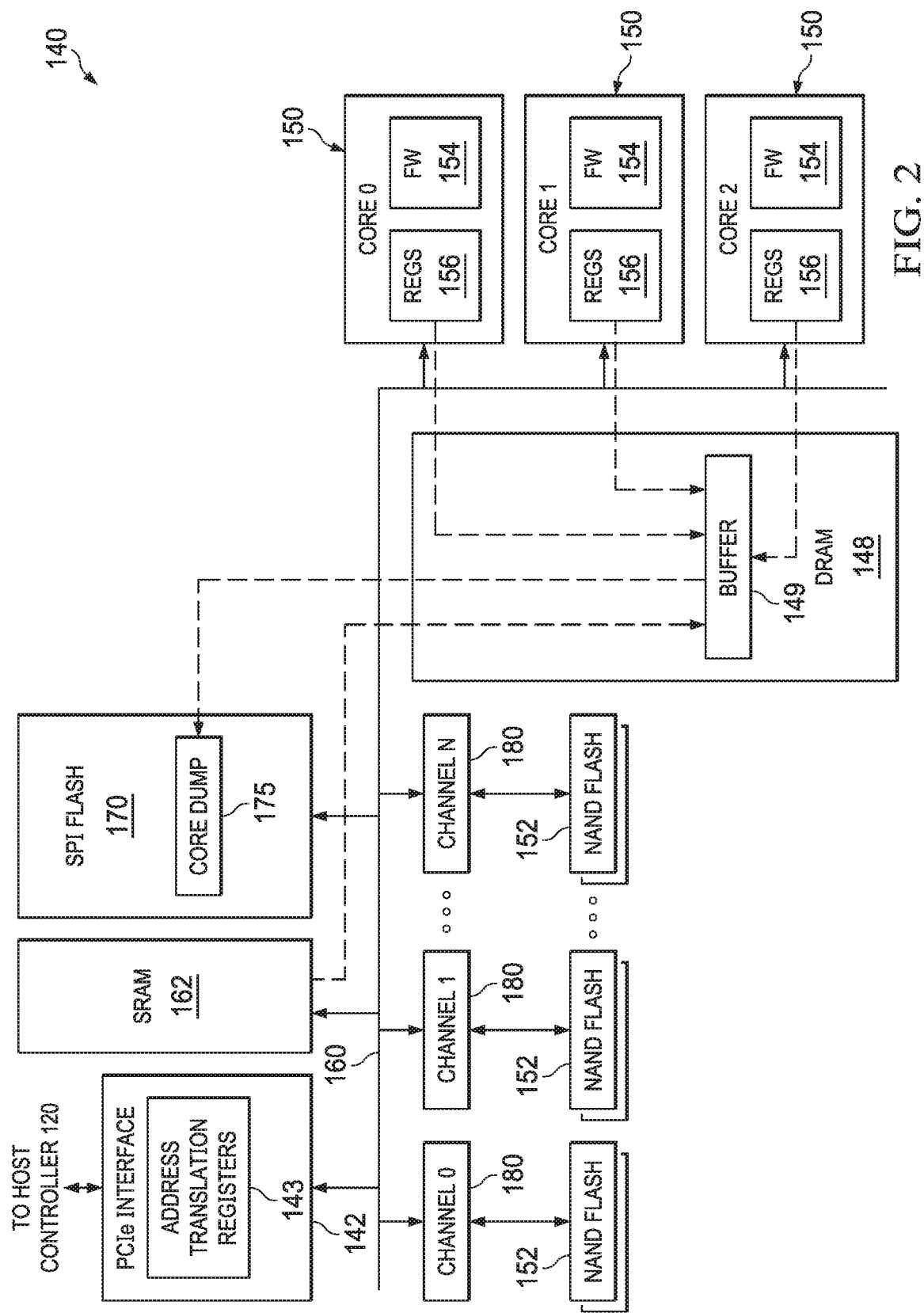
FIG. 2 shows an example architecture of a solid state storage card in accordance with various examples.

FIG. 2 shows a block diagram of a solid state storage card 140 in more details in accordance with various embodiments. As shown in this example, the solid state storage media card 140 includes the interface 142, static random access memory (SRAM) 162, flash memory 170 (in this particular embodiment, a Serial Peripheral Interface (SPI) flash memory), processor cores (sometimes referred to as processors) 150 comprising Core0, Core1, and Core2, DRAM volatile storage 148 (also termed DRAM 148), channels 180 comprising Channel 0, Channel 1, . . . , Channel n, and flash storage 152 comprising one or more NAND flash devices associated with each channel 180. In further embodiments the flash storage 152 comprises NOR flash or another type of flash storage. The NVM 144 of FIG. 1 is implemented in the example of FIG. 2 as the flash memory 170. Each channel 180 comprises a circuit to write data to the corresponding NAND flash device and read data from the NAND flash device. The various components shown are coupled together via a bus 160. The solid state storage card 140 may be implemented as a circuit card assembly comprising a printed circuit board (PCB) on which the components shown in FIG. 2 are mounted. The components are coupled together by way of conductive traces on the PCB.

Although three cores 150 are shown in the example of FIG. 2, more or less than three cores can be included in other embodiments. Each core 150 includes volatile storage (e.g., random access memory) into which firmware (machine instruction) 154 are stored for execution by that core. The firmware 154 executed by a core may cause the core to respond to access requests from the host controller 120 (e.g., read and write requests for the NAND flash 152). Each core 150 also may include one or more execution register 156. The execution registers 156 may include a program counter register, status register, general purpose data registers, address registers, etc.

Each core 150 includes volatile memory as noted above. The core 150 may receive an allocation of at least a portion of the memory that is not shared with other cares. In some embodiments, a portion of the memory of a given core can be shared among the cores. Similarly, each core 150 may receive a dedicated portion of the DRAM 148 and SRAM 162, while other portions of the DRAM and/or SRAM can be shared among the cores 150.

The SRAM 162 may be used to store firmware and/or data used by the cores 150. For example, the amount of volatile memory within a given core may not be large enough to store all of the firmware that the core may need to operate, and some of the firmware can thus be stored in the SRAM 162 pending its execution by a given core.

The PCIe interface 142 includes address translation registers 143 which can be used to map the SPI flash's memory address range to memory addresses accessible to the host controller 120. Upon initialization of the solid state storage card 140, the address translation registers 143 are written to map host controller addresses to SPI flash memory addresses to thereby provide the host controller 120 with the ability to directly access the SPI flash memory 170. The SPI flash memory 170 comprises non-volatile memory that is used to store core dump data for subsequent access by the host controller 120. The host controller 120 communicates to each solid state storage card through its PCIe interface 142. In some embodiments, the host controller uses the non-volatile memory express (NVMe) protocol over the PCIe interface to exchange commands and data with each solid state storage card. Other protocols besides the NVMe protocol can be used as well.

A core dump can be triggered in any of multiple ways. For example, firmware executing on any of the cores 150 may contain Assertion instructions. An Assertion is a statement that a predicate (e.g., a Boolean-valued function, a true-false expression, etc.) is expected to always be true at that point in the code. If an assertion evaluates to false, an assertion failure results and the assertion instruction triggers a software interrupt. The software interrupt is processed by an interrupt handler running in the solid state storage card, which causes the interrupt handler to perform the core dump. Thus, each solid state storage card 140 is capable of monitoring its execution state and self-triggering a core dump when errant behavior is detected.

Additionally or alternatively, the host processor 120 can trigger a solid state storage card to perform a core dump through assertion of signal on a dedicated signal line from the host controller 120 to each solid state storage card. The host processor 120 may implement a heartbeat or other type of time-out function which, absent an anticipated response from a solid state storage card 140 within an allotted period of time, causes the host processor 120 to trigger the solid state storage card to perform a core dump. Thus, core dumps can be initiated either or both by the solid state storage cards 140 or the host controller 120.

FIG. 2 illustrates a process that the interrupt handler can perform to implement a core dump. As indicated by the dashed arrows, a buffer 149 is allocated in the DRAM 148 to store the data to be saved for the core dump. The data may include execution state data from SRAM 162 as well as execution state data from one or more of the cores 150.

The following list provides an example of the types of data that are saved during a core dump:
Debug Data: a message log that includes trace messages with time stamps
For each core: contents of the registers 156, contents of core dedicated volatile memory, contents of core-dedicated allocation of SRAM 162, contents of core-dedicated allocation of DRAM 148
Contents of shared SRAM 162
Contents of shared DRAM 148
NAND flash processing data including:
  A descriptor log
  Contents of a NAND command buffer
  Contents of a sequencer first in/first out (FIFO) buffer
NVMe processing data including data pertaining to NVMe commands In some examples, in addition to the core dump data itself, metadata comprising information about the core dump is also stored in the SPI flash memory. Such metadata may identify components of the core dump data stored in the SPI flash storage device, the location of each such component within the SPI flash storage device, and the size of the core dump. In on example, the metadata comprises a directory structure of the core dump containing such information.

Once the core dump data is collected into the DRAM buffer 149, the error handler then writes the collected core dump data to the SPI flash memory 170 as core dump 175. As SPI flash memory 170 is non-volatile memory, the core dump 175 persists across power cycles or resets of the solid state storage card 140.

The interrupt handler also arranges for the core dump 175 to be made available for access by the host controller 120 with little or no firmware support by the solid state storage card 140. The host controller 120 is able to directly access the solid state storage card's SPI flash memory 170. In one embodiment, the interrupt handler selects a base address register (BAR) memory-mapping space, specifies the lowest address of the memory range to expose to the host controller, specifies the highest address of the memory range to expose to the host controller, and enables the BAR and configures the size of the memory range to request in the host's memory map. Accordingly, the host is able to issue NVMe commands over the PCIe interface to read the contents of the SPI memory containing the corer dump 175 exposed to the host controller.

Figure 3:
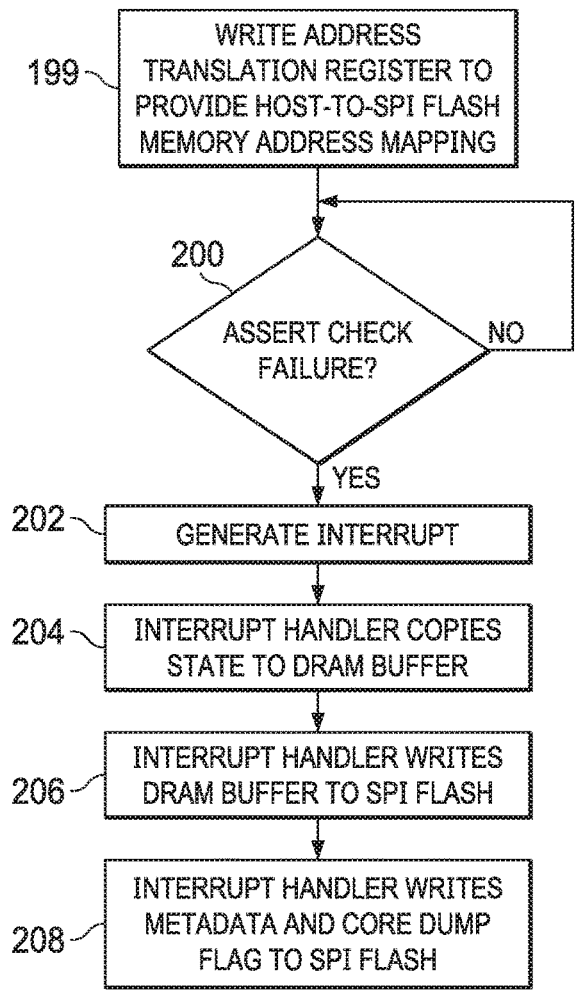
FIG. 3 illustrates a flow chart for operations performed by the solid state storage card in accordance with embodiment.

FIG. 3 illustrates a method performable by each of the solid state storage cards 140 to save core dump data to the SPI flash memory 170 in accordance with the disclosed embodiments. The operations may be performed in the order shown, or in a different order. Further, the operations may be performed sequentially, or two or more of the operations may be performed concurrently. As noted above, at 199 during initialization of each solid state storage card 140, the address translation registers 143 within the PCIe interface 142 are written to map host controller addresses to SPI flash memory addresses to thereby permit the host controller to submit requests to access the core dump 175 from the SPI flash memory 170 of the solid state storage card.

At 200, the method includes determining whether an assertion check has failed. This operation may be performed by the execution of one or more assertion instructions embedded within the firmware executing on one or more of the cores 150 as explained above. If an assertion failure is detected (the "yes" branch from 200), an interrupt is generated at 202. The interrupt may be a software interrupt generated by the assertion instruction and may cause the interrupt handler to perform operations 204-210.

At 204, the method includes copying state data to a buffer in the DRAM 148 (e.g., DRAM buffer 149). The state data copied may include some or all of the data listed above and/or different data. Once the state data is collected in one buffer in the DRAM 148, the contents of that DRAM buffer are written to the SPI flash as indicated at 206.

At 208, the interrupt handler then writes metadata and sets a core dump flag into the SPI flash memory 170. The metadata may specify the size of the core dump 175 (e.g., number of byes), the starting address for the core dump data, and other information associated with the core dump data. The core dump flag may be part of the metadata, or a separate value. The core dump flag may be set to one of multiple states, such as a first state and a second state. The first state may be a "lock" state and the second state may be an "unlock" state. A locked core dump flag indicates that the core dump has not been retrieved by the host controller 120, which otherwise will reset the core dump flag to its unlock state upon retrieval of the core dump data from the SPI flash memory 170.

Figure 4:
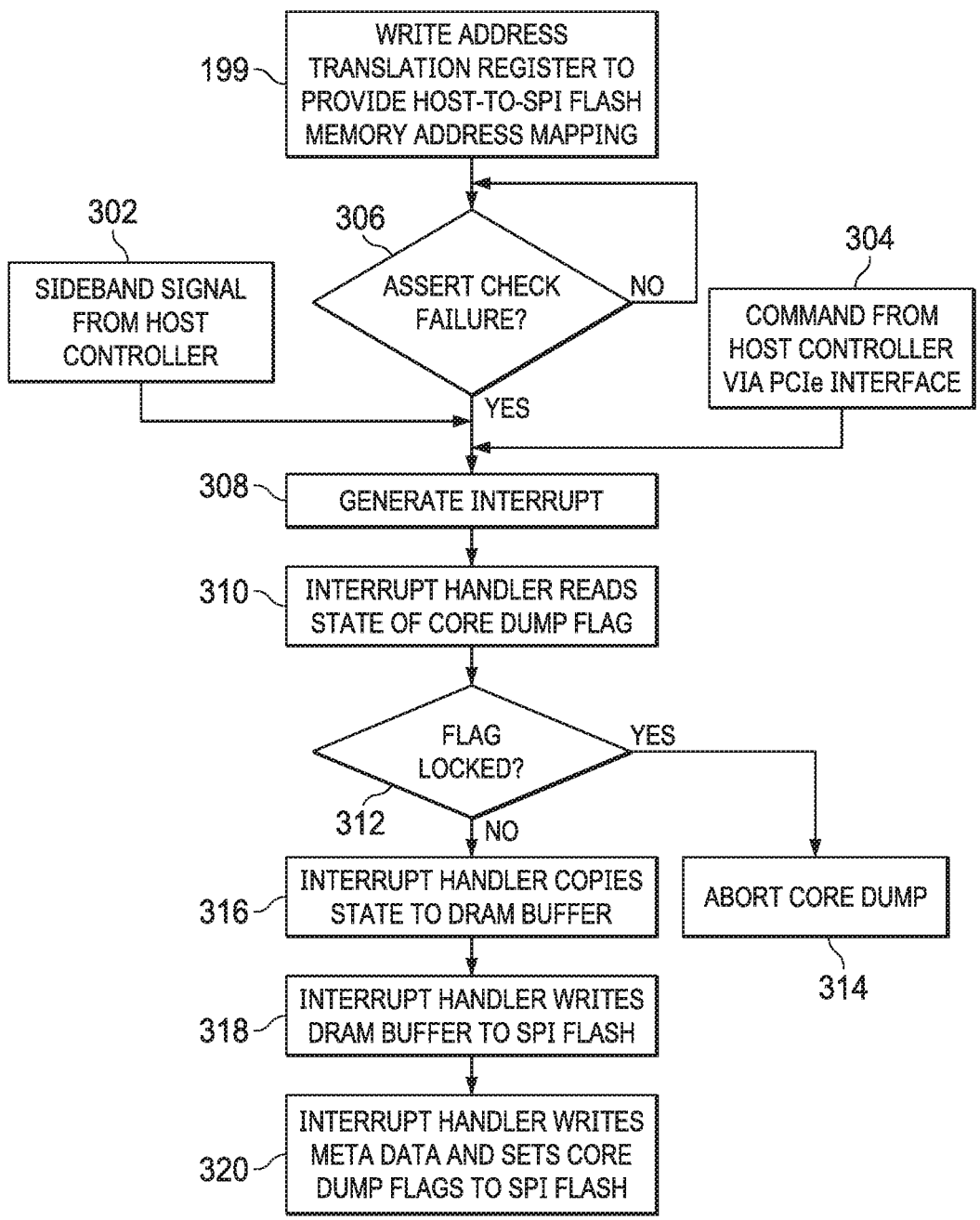
FIG. 4 illustrates a flow chart for operations performed by the solid state storage card in accordance with another embodiment.

In some embodiments, the core dump lock flag partially controls the operation of the solid state storage card 140 following a core dump. FIG. 4 illustrates another embodiment of the operation of a solid state storage card 140 for performing a core dump. The operations may be performed in the order shown, or in a different order. Further, the operations may be performed sequentially, or two or more of the operations may be performed concurrently. As was the case for FIG. 3, at 199 during initialization of each solid state storage card 140, the address translation registers 143 within the PCIe interface 142 are written to map host controller addresses to SPI flash memory addresses to thereby permit the host controller to submit requests to access the core dump 175 from the SPI flash memory 170 of the solid state storage card.

Three different triggers for a core dump are depicted at 302, 304, and 306. Any or all of these triggers may initiate the core dump. Operations 302 and 304 depict that the host controller 120 can initiate the core dump in the solid state storage card 140 by way of a dedicated signal (302) or by way of a command (e.g., an NVMe command) over the PCIe interface (304). Operation 306 shows that one or more cores 150 within the solid state storage card 140 may implement one or more assertion instructions that check for aberrant behavior at various execution check points within the executing firmware.

An interrupt is generated at 308. The interrupt may comprise a hardware interrupt (e.g., via the sideband signal at 302) or a software interrupt (e.g., 304, 306). At 310, the interrupt handler reads the state of the core dump flag, if any, in the SPI flash memory 170. If the solid state storage card 140 had previously performed a core dump, then the core dump flag may remain persistent in the SPI flash. If the core dump flag is locked (which indicates that the previous core dump data has not yet been retrieved by the host controller 120), the interrupt handler aborts the current core dump at 314 to avoid overwriting the previous core dump. Otherwise, the interrupt handler continues at 316-320, which track operations 204-208 as described above, thereby overwriting the previous core dump. In some embodiments, even if upon initiating a new core dump, the core dump flag is locked, the interrupt handler performs the new core dump and overwrites the old core dump. Thus, in one embodiment, each core dump overwrites the previous core dump regardless of whether the prior core dump had been retrieved by an external device such as the host controller 120, and in other embodiment, a new core dump is only completed if the prior core dump has been retrieved by the host controller.

Figure 5:
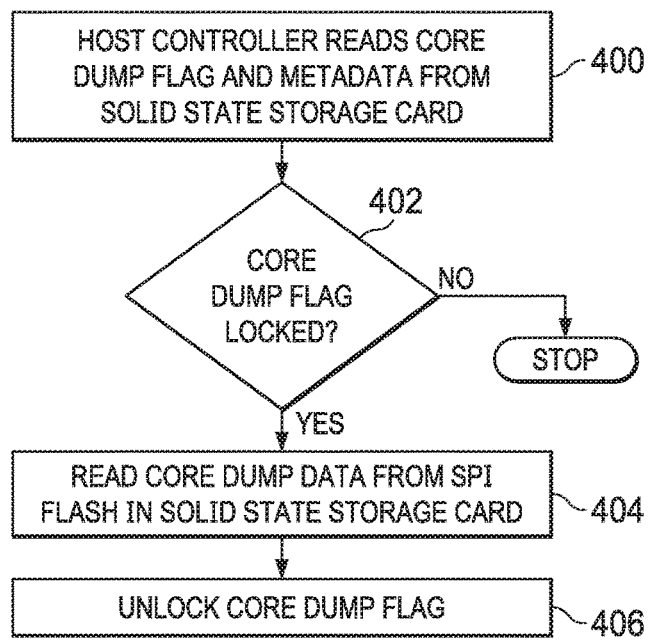
FIG. 5 illustrates operations performed by a host controller in accordance with an embodiment.

FIG. 5 illustrates a method implemented by the host controller 120 following a core dump performed by a solid state storage card 140 for reading the core dump data. The operations may be performed in the order shown, or in a different order. Further, the operations may be performed sequentially, or two or more of the operations may be performed concurrently.

At 400, the host controller 120 reads the core dump flag and metadata from the SPI flash of a solid state storage card 140. This operation may be performed during the process of downloading firmware from the host controller 120 to the solid state storage card to be executed by the cores 150. For example, when a solid state storage card 140 powers on and initializes, the card may not have sufficient firmware to provide the card with some or most of its functionality such as the ability to respond to read and write transactions for the NAND flash 152. Before, or after downloading the necessary firmware to the solid state storage card, the host controller 120 may read, if present, the metadata and core dump flag. The host controller alternatively or additionally may check for a core dump in response to receipt of a user command, detection of an expected event, etc.

The core dump flag set to the locked state indicates that core dump data is present and has not yet been retrieved by the host controller. At 402, the host controller determines whether the core dump flag is locked. If the flag is not locked or is not even present, the process of reading the core dump stops (and the host controller may continue with downloading a firmware image to the solid state storage card).

If the core dump flag is locked (indicating that a core dump is present and has not already been retrieved), then at 404, the method includes reading the core dump data from the SPI flash memory 170 within the solid state storage card 140. The read command may be implemented using the NVMe protocol. The host controller issues a command to unlock the core dump flag. For example, the host controller issues an NVMe command to change the state of the core dump flag from locked to unlocked to thereby indicate that the core dump has been retrieved by the host controller.

Certain terms are used throughout the following description and claims to refer to particular system components. As one skilled in the art will appreciate, different companies may refer to a component by different names. This document does not intend to distinguish between components that differ in name but not function. In the foregoing discussion and in the claims, the terms "including" and "comprising" are used in an open-ended fashion, and thus should be interpreted to mean "including, but not limited to. . . ." Also, the term "couple" or "couples" is intended to mean either an indirect or direct wired or wireless connection. Thus, if a first device couples to a second device, that connection may be through a direct connection or through an indirect connection via other devices and connections.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A storage system, comprising:
a host controller;
a solid state storage card, comprising:
  flash storage devices for storing user data;
  a serial peripheral interface (SPI) flash storage device;
  a dynamic random access memory (DRAM);
  a processor core coupled to the flash storage devices, SPI flash storage device, and DRAM, the processor core including registers and volatile memory;
  an address translation register configured to store address mappings between the SPI flash storage device and addresses used by the host controller to access the SPI flash storage device; and
  wherein the processor core is configured to execute an assertion checkpoint instruction to generate a software interrupt upon determining an invalid execution state of the solid state storage card;
  wherein the processor core is configured to execute an interrupt handler upon generation of the software interrupt to initiate a core dump to copy contents of the processor core registers and processor core volatile memory to the SPI flash storage device, and to write metadata to the SPI flash storage device; and
  wherein the host controller is configured to issue an access request to directly read the core dump from the SPI flash storage device using a memory address that is mapped using the address translation register to a memory address of the SPI flash storage device.

2. The storage system of claim 1, further comprising an external connection configured to receive an externally generated signal by the host controller which, when asserted, causes the interrupt handler to execute to initiate the core dump.

3. The storage system of claim 1, wherein the metadata includes a lock flag which is configurable to either of a first state or a second state, wherein the processor core that executes the interrupt handler sets the lock flag to the first state upon performance of the core dump, wherein the lock flag is configurable to the second state by an external command, and wherein during a subsequent initialization process for the solid state storage card, the processor core prevents the initialization process from completing upon a determination that the lock flag is still in the first state.

4. The storage system of claim 1, wherein the metadata includes a lock flag which is configurable to either of a first state or a second state, wherein the processor core that executes the interrupt handler determines the state of the lock flag, wherein the processor core:
  in the case that the lock flag is in the second state, copies the contents of the processor core registers and processor core volatile memory to a temporary buffer in the DRAM, and writes contents of the temporary buffer to the SPI flash storage device; and
  in the case that the lock flag is in the first state, does not copy the temporary buffer to the SPI flash storage device.

5. The storage system of claim 1, wherein during an initialization process for the solid state storage card, the SPI flash storage device, but not the flash storage devices for storing user data, is accessible over an external interface.

6. The storage system of claim 5, wherein the external interface is a Peripheral Component Interface Express (PCIe) interface and wherein the SPI flash storage device is accessible over the PCI interface through use of the Non-Volatile Memory Express (NVMe) protocol.

7. A method, comprising:
  writing an address translation register in an interface of a solid state storage card to map a memory address of an external device to a memory address in non-volatile memory of the solid state storage card;
  triggering a core dump for a solid state storage card;
  generating an interrupt to invoke an interrupt handler;
  copying, by the interrupt handler, execution state data of a solid state storage card to a memory buffer;
  writing, by the interrupt handler, core dump data from the memory buffer to non-volatile memory; and
  directly reading, by the external device, the core dump data from the non-volatile memory of the solid state storage card using the address translation register.

8. The method of claim 7, wherein writing the address translation register comprises specifying a lowest address of the core dump data.

9. The method of claim 7, wherein writing the address translation register in the interface comprises updating the address translation register in a Peripheral Component Interconnect Express (PCIe) interface.

10. The method of claim 7, further comprising:
  setting a core dump lock flag in the non-volatile memory to a lock state by the solid state storage card; and
    reading the core dump lock flag from the non-volatile memory by the external device;

wherein reading the core dump data comprises, responsive to a determination that the core dump lock flag is in the lock state, reading the core dump data by the external device from the non-volatile memory of the solid state storage card.

11. The method of claim 7, further comprising determining that a core dump flag is in the lock state, and responsive to the determination that the core dump flag is in the lock state, aborting the core dump.

\* \* \* \* \*